(12) United States Patent
Snyder, II et al.

(10) Patent No.: US 9,379,992 B2
(45) Date of Patent: Jun. 28, 2016

(54) METHOD AND AN APPARATUS FOR VIRTUALIZATION OF A QUALITY-OF-SERVICE

(71) Applicant: Cavium, Inc., San Jose, CA (US)

(72) Inventors: Wilson Parkhurst Snyder, II, Holliston, MA (US); Thomas Frederick Hummel, Natick, MA (US); Anna Karen Kujtkowski, Rochdale, MA (US)

(73) Assignee: CAVIUM, INC., San Jose, CA (US)

( * ) Notice: Subject to any disclaimer, the term of this patent is extended or adjusted under 35 U.S.C. 154(b) by 237 days.

(21) Appl. No.: 14/140,503

(22) Filed: Dec. 25, 2013

(65) Prior Publication Data

US 2015/0180793 A1 Jun. 25, 2015

(51) Int. Cl.
*H04L 12/861* (2013.01)
*H04L 12/823* (2013.01)
*H04L 12/851* (2013.01)
*H04L 12/863* (2013.01)
*H04L 12/26* (2006.01)

(52) U.S. Cl.
CPC .............. *H04L 47/326* (2013.01); *H04L 47/24* (2013.01); *H04L 47/625* (2013.01); *H04L 43/0817* (2013.01)

(58) Field of Classification Search
CPC ... H04L 47/326; H04L 47/6255; H04L 47/29; H04L 47/30; H04L 49/9047; H04L 47/10; H04L 47/70; H04L 49/103; H04L 49/252; H04L 49/90; H04L 12/5693; H04L 47/20; H04L 47/6215; H04L 47/2441; H04L 47/822; H04L 47/823; H04L 47/621
See application file for complete search history.

(56) References Cited

U.S. PATENT DOCUMENTS

| | | | | |
|---|---|---|---|---|
| 5,781,801 A * | 7/1998 | Flanagan | ................ | H04L 47/10 370/235 |
| 6,577,625 B1 * | 6/2003 | Chiou | ................... | H04L 12/413 370/352 |
| 7,535,907 B2 * | 5/2009 | Hussain | ................. | H04L 49/90 370/392 |
| 8,862,560 B1 * | 10/2014 | Wu | ......................... | G06F 17/30 707/693 |
| 2003/0017831 A1 * | 1/2003 | Lee | ......................... | H04L 47/10 455/453 |
| 2003/0202476 A1 * | 10/2003 | Billhartz | ............. | H04L 12/5695 370/236 |
| 2004/0218617 A1 * | 11/2004 | Sagfors | ............... | H04L 41/0896 370/412 |
| 2005/0094567 A1 * | 5/2005 | Kannan | ............... | H04L 12/2697 370/241 |
| 2005/0281253 A1 * | 12/2005 | Veijalainen | ......... | H04L 12/5693 370/363 |
| 2014/0105218 A1 * | 4/2014 | Anand | ................ | H04L 47/6255 370/412 |

* cited by examiner

*Primary Examiner* — Curtis A Alia
(74) *Attorney, Agent, or Firm* — pkalousek.ip (57) ABSTRACT

A method and a system embodying the method for virtualization of a quality of service, comprising associating a packet received at an interface with an aura via an aura identifier; determining configuration parameters for the aura; determining a pool for the aura; determining the state of the pool resources, the resources comprising a level of buffers available in the pool and a level of buffers allocated to the aura; and determining a quality of service for the packet in accordance with the determined state of the pool and the configuration parameters for the aura, is disclosed.

24 Claims, 4 Drawing Sheets

METHOD AND AN APPARATUS FOR VIRTUALIZATION OF A QUALITY-OF-SERVICE

BACKGROUND

1. Field

The present disclosure relates to memory management. More particularly, this invention is directed toward virtualization of a quality-of-service 2. Description of Related Technology A receipt of a packet over a network at a node, e.g., a switch, in a communication system, requires allocation of memory to process the packet. However, a memory is a limited resource; therefore, numerous techniques have been developed to insure a level of Quality-of-Service (QoS). QoS is the overall performance of the network communication as seen by the users of the network, and is quantified by measuring different parameters, e.g., error rates, bandwidth, throughput, transmission delay, availability, jitter, and other parameters known to persons of ordinary skills in the art.

To assure a required QoS, in view of the limited memory, several methods are commonly used. A tail drop method is a simple queue management technique used to decide when to drop packets. When the allocated queue reaches a first pre-determined capacity, the newly arriving packets are dropped until the queue capacity is increased to a second pre-determined capacity. The method does not discriminate between packets, all packets are treated equally. A queue is an organization of data into a structure in which entities, i.e., the data comprising a packet, are kept. The data structure may be implemented as collections of buffers, i.e., a portion of a memory that may be allocated to a hardware or a software entity can use for some purpose. Backpressure refers to a queue management method that requests the source of packets to cease packet transmission when an allocated queue reaches a first pre-determined capacity until the queue capacity is increased to a second pre-determined capacity. A random early discard (RED) method monitors the average queue size and drops packets based on statistical probabilities. If a queue is almost empty, all incoming packets are accepted. As the queue grows, the probability for dropping an incoming packet increases.

In a more sophisticated implementation the various QoS management method are combined; thus varying the technique according to change in parameters related to each of the technique. The parameters are often selected based on qualities characterizing of the packet, which is to use the memory, e.g., the physical interface a packet was received on, fields selected from the packet, e.g., Differentiated Services (DIFF-SRV), IEEE 802.1 Q VLAN priority, and other characteristics known to a person of ordinary skills in the art.

The current trend towards virtualization requires reconsideration of QoS management. Virtualization is a process by which a virtual version of computing resources, such as hardware and software resources, i.e., a central processor unit, a storage system, an input/output resources, a network resource, an operating system, and other resources known in the art, are simulated by a computer system, referred to as a host machine. A typical host machine may comprise a hardware platform that optionally together with a software entity i.e., an operating system operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

Consequently, the virtualization is likely to increase the pressure on management of memory resources, due to increased need for numerous virtual address spaces in memory. This results in a need for a packet received to be directed to one of these virtual address spaces, each of the address spaces possibly having a different QoS. The presence of many virtual address spaces, associated QoS levels, and many QoS methods potentially requires large, complicated structures.

Accordingly, there is a need in the art for a method and an apparatus embodying the method, providing a solution to the above identified complexity problem while enabling flexibility, as well as additional advantages.

SUMMARY

In an aspect of the disclosure, an apparatus and a method for a quality of service according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," an and the are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable a person having ordinary skill in the art to practice the present invention. Modifications to various aspects of a presented throughout this disclosure will be readily apparent to a person having ordinary skill in the art, and the concepts disclosed herein may be extended to other applications.

Figure 1:
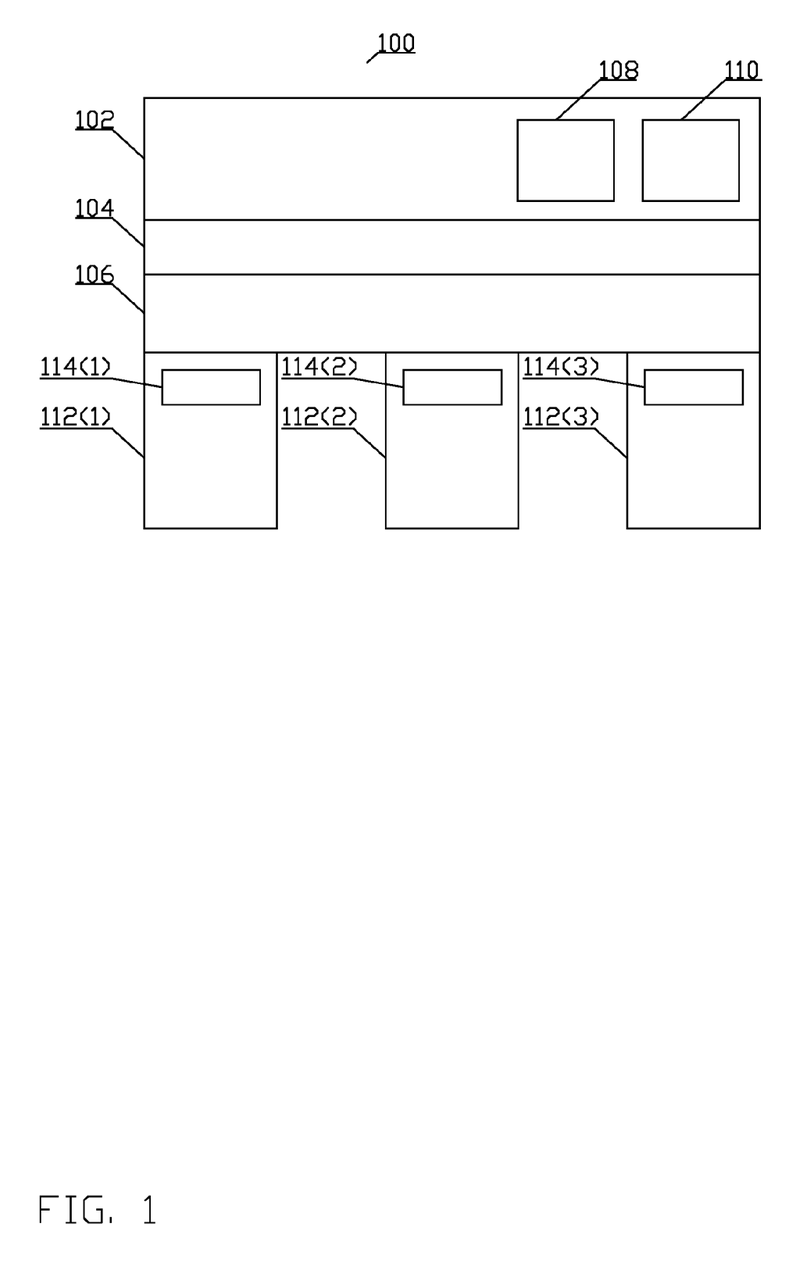
FIG. 1 depicts a conceptual structure of a virtualization system in accordance with an aspect of this disclosure.

FIG. 1 depicts a conceptual structure of a virtualization system 100 in accordance with an aspect of this disclosure. A hardware platform 102 together with an optional software entity 104, i.e., operating system, comprises a host machine operating a Type 2 hypervisor, also known as hosted hypervisor 106. As well known to a person having ordinary skill in the art, the optional software entity 104 is not necessary for Type 1 hypervisors, also known as native hypervisors. The aspects of the disclosure are equally applicable to both types of the hypervisor.

The hardware platform 102 comprises all physical entities embodying computing resources required by a specific host machine, i.e., a central processor unit, input/output resources, a storage system, a network resource, and other resources known to a person having ordinary skill in the art. To avoid undue complexity, only a storage system 108 and a network resource 110 are shown. The storage system 108, may comprise a hard drive, a semiconductor based memory, and other types of memory known in the art. The network resource 110 comprises at least one NIC.

The hypervisor 106 creates and operates at least one virtual machine 112. Although three virtual machines 112 are shown, a person skilled in the art would understand that any number, including a single virtual machine, may exist. Parameters configuring operation of the virtual machine 112 are defined via structure 114. In an aspect, the structure 114 may comprise at least one register.

Figure 2A:
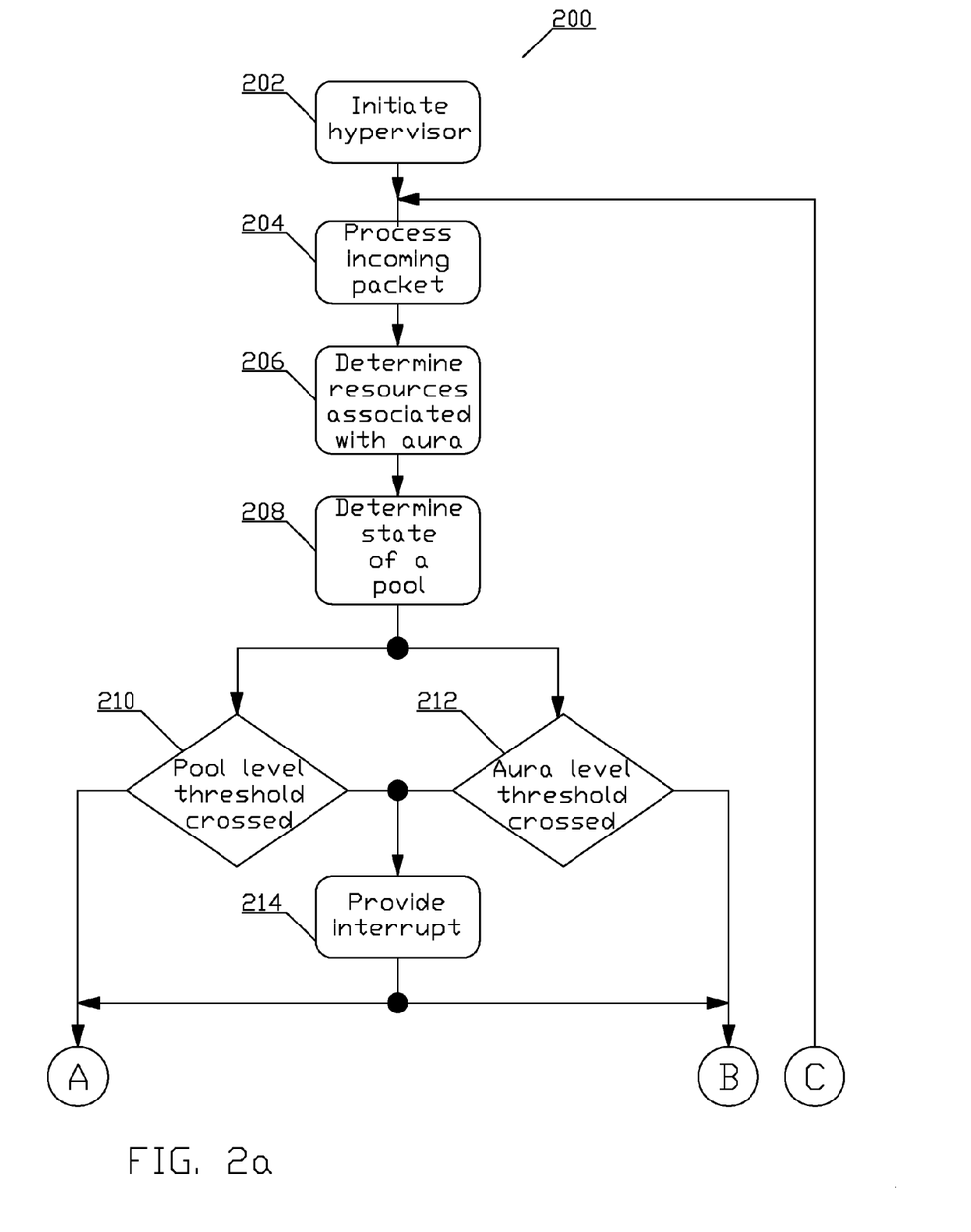
FIG. 2a depicts a first part of a flow chart of a process for virtualization of a quality-of-service.
Figure 2B:
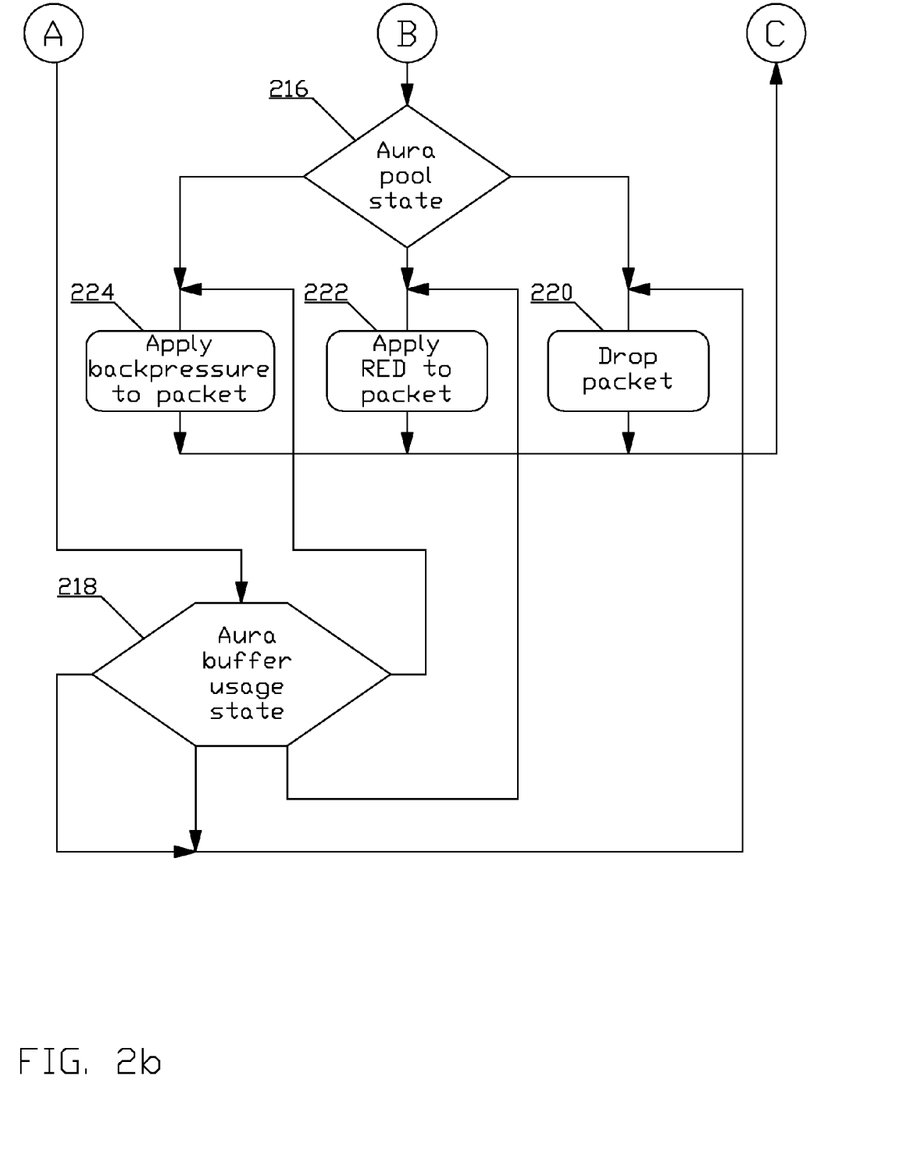
FIG. 2b depicts a second part of the flow chart of the process for virtualization of the quality-of-service.
Figure 3:
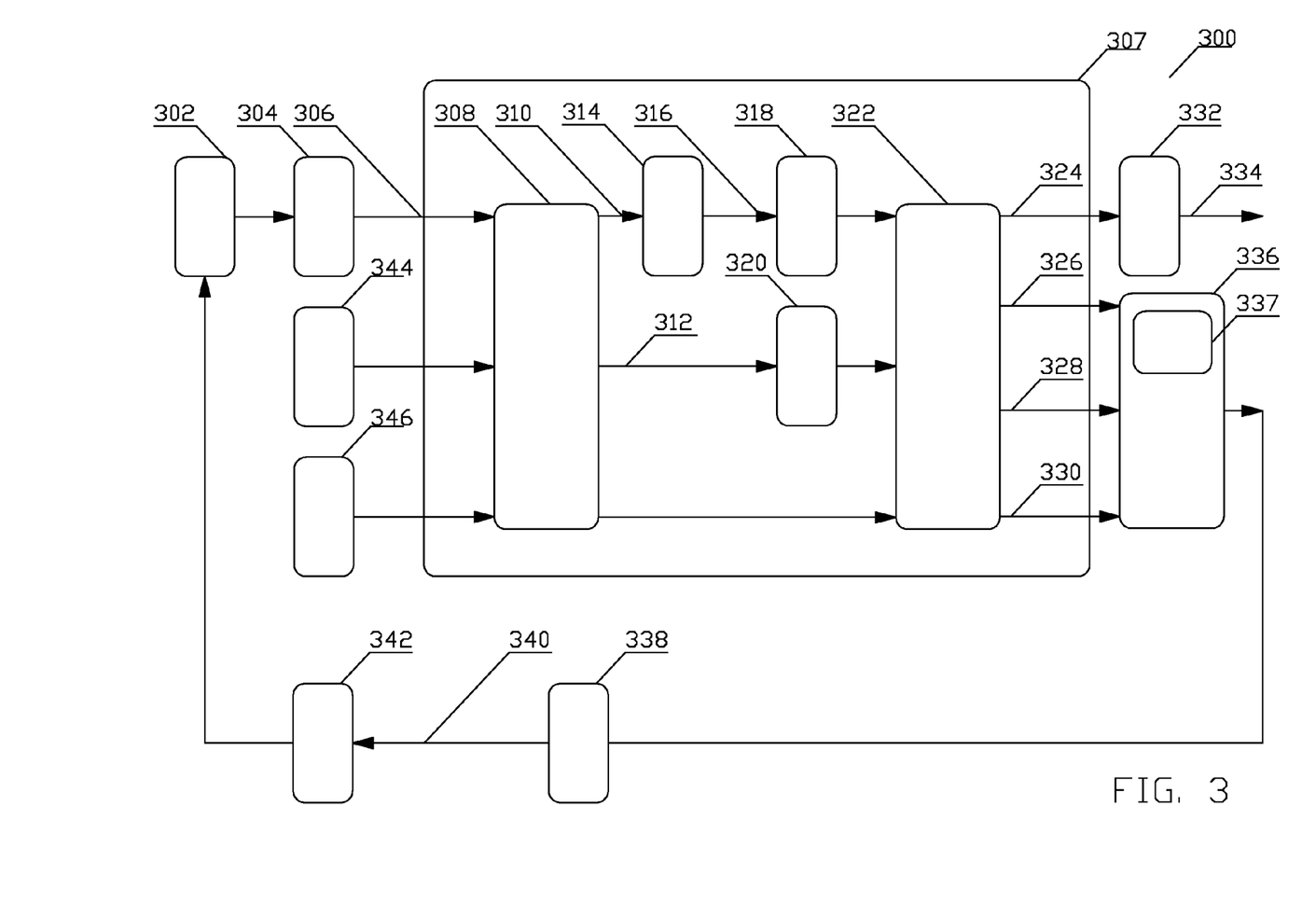
FIG. 3 depicts a conceptual structure and information flow among elements of the conceptual structure enabling virtualization of the quality-of-service.

Reference is made to FIG. 2 depicting a flow chart of a process 200 for virtualization of a quality-of-service. To further clarify the relationship between certain elements of a conceptual structure and information flow among the elements of the structure enabling virtualization of quality-of-service depicted in FIG. 3, in the FIG. 2 description, the references to structural elements of FIG. 3 are in parenthesis.

In step 202, a hypervisor (not shown) initiates structures that configure operation of the hypervisor and all subordinate entities, i.e., an interface (302), VNICs' virtual machine(s) (not shown), the VNICs (not shown), and other entities. Although some of the listed entities are not shown in FIG. 3, a person of ordinary skills in the art will understand that the structure depicted in FIG. 2 is implemented by the virtualization system 100. The process continues in step 204.

In step 204, an incoming packet arrives at an interface (302), e.g., the NIC, an Ethernet Media Access Control (MAC), or other interface known to a person of ordinary skills in the art, and is parsed by a parser (304). In an aspect, the parser is implemented at the interface (302). Information from fields of the parsed packet, together with configuration information, and any additional information is evaluated by the parser (304). Based on the evaluation the packet is associated with an aura by being assigned an aura identifier (306). The term "aura" is used to identify how to record and process flow control for a packet. The information fields may comprise e.g., a source Internet Protocol (IP) address, the source MAC address, a destination IP address, the destination MAC address, VLAN headers, and other fields known to a person skilled in the art. The configuration information may comprise, e.g., mapping of a source port number to a number of buffers that may be allocated to the aura identified by the aura identifier (306), and addition for IEEE 802.1 Q VLAN priority and/or DIFFSRV priorities, and other configuration information known to a person skilled in the art. The additional information may comprise, e.g., a port at which the packet arrived, the interface at which the packet arrived and other information known to a person skilled in the art. The process continues in step 206.

In step 206, the aura identifier (306) is provided to an aura management block (307). In the aura management block (307), a resource control block (308) determines resources controlling quality-of-service (QoS) for the packet associated with the aura identified by the aura identifier (306).

Such resources comprise a pool of available buffers from which a buffer will be allocated to the aura identified by the aura identifier (306). The maximum number of buffers that may be allocated to the aura identified by the aura identifier (306) is determined by a configuration parameter AURA_CNT_LIMIT; the number of buffers allocated at a particular time is determined by a parameter AURA_CNT. The term buffer comprises a portion of a memory that may be allocated to a hardware or a software entity. The term pool is used to identify a plurality of buffers. In an aspect, a buffer pool is implemented and managed as disclosed in a co-pending application entitled "A METHOD AND AN APPARATUS FOR MEMORY ADDRESS ALLIGNMENT", application Ser. No. 14/140,494, filed on Dec. 25, 2013. A buffer may not belong to more than one pool.

To allocate the resources, the aura identifier (306) is used to determine an aura pool number (310) and an aura level (312). Such a determination may be carried out by mapping an aura identifier to an aura pool number and an aura level by a structure, e.g., a look-up table. The mapping may map one or more aura identifier(s) onto a single pool. In case when more than one aura is mapped onto a single pool, the aura buffer allocation may be the same or different for the different aura identifiers.

The aura pool number (310) identifies a pool of available buffers from which a buffer will be allocated to the packet associated with the aura identified by the aura identifier (306). The aura level (312) comprises a value of a configuration parameter. For the purposes of clarity of the disclosure, the following notation is used. The configuration parameter of aura level related to the pool of available buffers is identified by notation AURA_POOL_LEVELS[ ]; the configuration parameter of aura level related to the buffers allocated to an aura is identified by notation AURA_CNT_LEVELS[ ]. An expression in the brackets [ ] indicates the QoS action to be taken at that level.

In an aspect, the expression may comprise DROP, indicating rejecting ("dropping") the packet. Another expression may comprise PASS, indicating accepting the packet. Yet another expression may comprise BP indicating accepting the packed and applying backpressure. However, a person of ordinary skills in the art will understand that other expressions indicating other QoS actions may be used.

Based on the foregoing, by means of an example, the notation AURA_POOL_LEVELS[PASS] indicates a value of the configuration parameter aura level related to the pool of available buffers, the value comprising a number of available buffers in the pool, which comprises a threshold for passing a packet associated with the aura or carrying out QoS action. By means of another example, the notation AURA_POOL_

CNT[PASS] indicates a value of the configuration parameter aura level related to the buffers allocated to an aura, the value comprising a number of buffers allocated to the aura, which comprises a threshold for passing a packet associated with the aura or carrying out QoS action.

The process continues in step 208.

In step 208, the state of the pool identified by the pool number (310) is determined. In an aspect the state of the pool is retrieved from a memory (314). The state of the pool comprises a level of buffers available in the pool (316), as well as a level of aura buffer allocated to the aura identified the aura identifier (306). In an aspect, the levels may comprise instant levels. In another aspect the instant levels may be further processed. Such processing may comprise, e.g., normalization and/or time-averaging. Consequently, the term "determined level(s)" is used to refer collectively to both instantaneous and processed level(s), unless explicitly noted.

Normalization rescales the determined levels relative to a maximum normalized level. In an aspect, the normalization comprises calculating a constant as a ratio of the maximum normalized level to a maximum level of the normalized entity; wherein the normalized entity comprises the level of buffers available in the pool or the level of aura buffer allocated to the aura. The determined value is then multiplied by the constant to yield the normalized value.

In an aspect, the constant is limited to powers of two, which may reduce the rescaled values to an interval as small as <0, 128>. By limiting the constant to powers of two, an alternative, computationally more efficient, calculation can be made by replacing multiplication by a shift, because a power of two multiply or divide is equivalent to a shift.

Time averaging may be calculated over a programmable time, wherein the programmable time includes zero time; thus yielding an instantaneous value. The time averaging may comprise, e.g., moving average, averaging across several recent time samples, averaging recent maximum over several time samples, averaging recent minimum over several time samples, and other averaging methods known to a person of ordinary skills in the art. The process continues either sequentially or in parallel in step 210 and step 212.

The determined levels is carried out in accordance with a schedule by a block (320) for each of the aura, and by a pool management block (318) for the pool. In an aspect, the schedule is periodic. In another aspect, the schedule is triggered by an event, e.g., a change in the buffer(s) allocation due to a regular processing of the packet, e.g., the packet is accepted and moved to a buffer, the packet is moved from the buffer to a target application, and other processing known to a person of ordinary skills in the art. Alternatively, hardware (344) or software (346) entities may increase or decrease the levels of aura buffer allocated to the aura identified the aura identifier (306) as disclosed infra.

In step 210, the determined level of buffers that are currently available in the pool (318) is compared in block (322) against a value of a first pre-determined threshold. In an aspect, the determined level of buffers is normalized. The first threshold is a configurable parameter, a value of which is determined, e.g., in accordance with a percentage of the number of total buffers comprising the pool. If the level of buffers that are currently available in the pool (316) crosses the value of the first pre-determined threshold, block (322) generates an indicator (324), which is provided to and instructs a block (332) to generate an interrupt (334), and the processing continues in step 214; otherwise, the processing continues in step 218.

In step 214, the block 332 provides the generated interrupt (334) to the hypervisor. The hypervisor may take an action to change QoS of packet(s) associated with the aura. By means of an example, the action may add resources to or remove resources from the pool in accordance to the direction of crossing the first threshold. In an aspect resources may be removed from the pool when the threshold was crossed from a level of buffers that are currently available in the pool being less than the value of the first pre-determined threshold to a level of buffers that are currently available in the pool being greater than the value of the first pre-determined threshold and vice versa. The action can be carried out via hardware (344) or software (346) entities as disclosed infra. The processing continues in step 218.

In step 212, the determined level of aura buffer allocated to the aura identified the aura identifier (306) is compared in block (322) against a value of a second pre-determined threshold. The second threshold is a configurable parameter, a value of which is determined, e.g., in accordance with a percentage of the number of aura buffer allocated to the aura. If the number of buffers aura buffer allocated to the aura crosses the value of the second pre-determined threshold, block (322) generates an indicator (324), which is provided to and instructs the block (332) to generate the interrupt (334). The processing continues in step 214.

In step 214, the block (332) provides the generated interrupt (334) to the hypervisor. The hypervisor may take an action to change QoS of packet(s) associated with the aura. By means of an example, the action may add resources to or remove resources from the pool in accordance to the direction of crossing the second threshold. In an aspect resources may be added to the pool when the threshold was crossed from a level of buffers that are currently available in the pool being less than the value of the first pre-determined threshold to a level of buffers that are currently available in the pool being greater than the value of the first pre-determined threshold and vice versa. The action can be carried out via hardware (344) or software (346) entities as disclosed infra. The processing continues in step 216.

In step 216, one or more comparisons of determined levels of the buffers available in the pool (316) with values of determined configuration parameters of aura level related to the pool of available buffers, i.e., AURA_POOL_LEVELS[ ]. Whether the next comparison will be carried out depends on the result of the preceding comparison, as disclosed infra. As alluded to supra, and disclosed in greater detail infra, the configurable parameters may be adjusted. Consequently, in an aspect, the levels may comprise instant levels. In another aspect the instant levels may be further processed. Such processing may comprise, e.g., normalization and/or time-averaging. Consequently, the term "determined configuration parameter" is used to refer collectively to both instantaneous and processed level(s) of the configuration parameter(s) unless explicitly noted.

If the determined level of the buffers available in the pool (316) is less than the determined configuration parameter AURA_POOLS_LEVELS[DROP], the block (322) generates an indicator (326), which is provided to and instructs a block (336) to drop the packet. In an aspect, the level of the buffers available in the pool is normalized and time averaged. In an aspect, the block (336) is implemented as a part of the interface (302). The processing continues in step 220; otherwise, the next comparison is carried out.

If the determined level of the buffers available in the pool (316) is between the determined configuration parameter AURA_POOLS_LEVELS[DROP], and the determined configuration parameter AURA_POOLS_LEVELS[PASS], the block 322 generates an indicator 328, which is provided to and instructs the block (332) to carry out random early discard. In an aspect, the level of the buffers available in the pool is normalized and time averaged. The processing continues in step 222; otherwise, the next comparison is carried out.

If the determined level of the buffers available in the pool (316) is less than the determined configuration parameter AURA_POOLS_LEVELS[BP], the block 322 generates an indicator 330, which is provided to and instructs the block (332) to apply backpressure. In an aspect, the level of the buffers available in the pool is normalized. The processing continues in step 224.

In step 220, the packet is dropped. The processing continues in step 204.

In step 222, a random early discard is carried out as disclosed in greater details infra. The processing continues in step 204.

In step 224, backpressure is applied as disclosed in greater details infra. The processing continues in step 204.

In step 218, one or more comparisons of determined level of aura buffer allocated to the aura identified the aura identifier (306) with the values of the determined configuration parameters related to the buffers allocated the aura, i.e., AURA_CNT_LEVELS[ ]. Whether the next comparison will be carried out depends on the result of the preceding comparison, as disclosed infra. As alluded to supra, and disclosed in greater detail infra, the configurable parameters may be adjusted. Consequently, in an aspect, the levels may comprise instant levels. In another aspect the instant levels may be further processed. Such processing may comprise, e.g., normalization and/or time-averaging. Consequently, the term "determined configuration parameter" is used to refer collectively to both instantaneous and processed level(s) of the configuration parameter(s) unless explicitly noted.

If the determined level of aura buffer allocated to the aura identified the aura identifier (306) is greater than the determined configuration parameter AURA_CNT_LIMIT, the block (322) generates an indicator (326), which is provided to and instructs the block (332) to drop the packet. In an aspect, the level of aura buffer allocated to the aura identified the aura identifier is normalized. The processing continues in step 220; otherwise, the next comparison is carried out. If the determined level of aura buffer allocated to the aura identified the aura identifier (306) is greater than the determined configuration parameter AURA_CNT_LEVELS[DROP], the block (322) generates an indicator (324), which is provided to and instructs the block (332) to drop the packet. In an aspect, the level of aura buffer allocated to the aura identified the aura identifier is normalized. The processing continues in step 220; otherwise, the next comparison is carried out. If the determined level of aura buffer allocated to the aura identified the aura identifier (306) is between the determined configuration parameter AURA_CNT_LEVELS[PASS] and the determined configuration parameter AURA_CNT_LEVELS[DROP], the block (322) generates an indicator (328), which is provided to and instructs the block (332) to carry out random early discard. In an aspect, the level of aura buffer allocated to the aura identified the aura identifier is normalized and time averaged. The processing continues in step 222; otherwise, the next comparison is carried out.

If the determined level of aura buffer allocated to the aura identified the aura identifier (306) is less than the determined configuration parameter AURA_CNT_LEVELS[BP] the block (322) generates an indicator (330), which is provided to and instructs the block (332) to apply backpressure. In an aspect, the level of aura buffer allocated to the aura identified the aura identifier is normalized and time averaged. The processing continues in step 224.

In step 220, the packet is dropped. The processing continues in step 204.

In step 222, a random early discard is carried out as disclosed in greater details infra. The processing continues in step 204.

In step 224, backpressure is applied as disclosed in greater details infra. The processing continues in step 204.

Any time, the status of the levels of the buffers available in the pool (316) and/or the levels of aura buffer allocated to the aura identified the aura identifier (306) is changed due to the change in buffer(s) use, the determined state of the pool identified by the pool number (310) and the determined level of aura buffer allocated to the aura identified the aura identifier (306) are recalculated. Such a change in the buffer(s) use may be due to a regular processing of the packet, e.g., the packet is accepted and moved to a buffer, the packet is moved from the buffer to a target application, and other processing tasks known to a person of ordinary skills in the art.

Additionally, hardware (344) or software (346) entities may increase or decrease the level of aura buffers allocated to the aura identified the aura identifier (306). This allows the QoS to be adjusted. Such hardware entities may comprise, coprocessor(s) carrying additional processing e.g., a compression engine (not shown) carrying out packet compression, the parser (304), and other hardware entities known to a person of ordinary skills in the art. The software entities may comprise, e.g., a software process allocating or reclaiming buffers, or multicasting a packet, and other software entities known to a person of ordinary skills in the art.

In an aspect, the coprocessor(s) using the same buffer pool may allocate or un-allocate buffers to an aura identified by an aura indicator (306), along with a corresponding increase or decrease to the levels of aura buffer allocated for the aura identified the aura identifier (306). This allows the QoS to be adjusted.

In another aspect, since the aura count does not have to correspond to physical resources, that is a buffer, the coprocessor(s) may increase or decrease the levels of aura buffer allocated for the aura identified the aura identifier (306) of an aura identified by an aura indicator 306, without allocating or un-allocating buffers, thus adjusting the QoS.

In yet another aspect, the parser (304) may increase or decrease the levels of aura buffer allocated for the aura identified the aura identifier (306) of an aura identified by an aura indicator 306. This allows the QoS to be adjusted without consuming buffers.

In yet another aspect, a software entity may increase or decrease the normalized levels of aura buffer allocated for the aura identified the aura identifier (306). This allows the QoS to be adjusted without consuming buffers.

As disclosed supra, in step 222, random early discard is carried out. In an aspect in the block (332), comparator (337) compares a pre-calculated drop probability to a pseudorandom number to determine whether to drop the packet or allocate a buffer for further processing of the packet.

For a drop probability in accordance to the determined level of the buffers available in the pool (316), the block (332) calculates a first drop probability as a function of the determined configuration parameter AURA_POOLS_LEVELS[PASS] and the determined configuration parameter AURA_POOLS_LEVELS[DROP]. In an aspect the function is linear, increasing from 0, when the value of the normalized and time averaged levels of the buffers available in the pool (316) is greater than or equal to the value of the determined configuration parameter AURA_POOLS_LEVELS[PASS], to 1, when the determined level of the buffers available in the pool (316) is less than or equal to the value of the determined configuration parameter AURA_POOLS_LEVELS[DROP]. However, any function bound by an interval <0; 1> is contemplated.

For a drop probability in accordance to the determined level of aura buffer allocated to the aura identified the aura identifier (306), the block (332) calculates a second drop probability as a function of the determined configuration parameter AURA_CNT_LEVELS[PASS] and the determined configuration parameter AURA_POOLS_LEVELS [DROP]. In an aspect the function is linear, increasing from 0, when the determined level of aura buffer allocated to the aura identified the aura identifier (306) is less than or equal to the value of the determined configuration parameter AURA_CNT_LEVELS[PASS], to 1, when the determined level of aura buffer allocated to the aura identified the aura identifier (306) is greater than or equal to the value of the determined configuration parameter AURA_POOLS_LEVELS[DROP]. However, any function bound to an interval <0; 1> is contemplated.

After calculating the first and the second drop probabilities, an entity in the aura management block (308), e.g., the block (322) combines the first drop probability and the second drop probability by taking the greater of the first drop probability and the second drop probability. The block (322) then generates a pseudorandom number from or scaled to an interval <0; 1>, and in an aspect, when the pseudorandom number is smaller than the value of the combined drop probabilities, the packet is dropped. In another aspect, the packet is dropped when the pseudorandom number is smaller than or equal to the value of the combined drop probabilities.

The different slopes of the linear functions are due to the higher of the determined level of the buffers available in the pool (316) being better, while the determined levels of aura buffer allocated to the aura identified the aura identifier (306) are deficits, with lower values being better.

As disclosed supra, in step 224 a backpressure is applied. Under certain circumstances, a pool may be assigned to auras corresponding to packets at different interfaces. Consequently, the backpressure needs to be applied at all the interfaces. To enable an aura to affect many interfaces, a two level mapping process is used. Referring back to FIG. 3, first level of mapping is carried out in block 338. Upon receiving an indicator 330, that a backpressure is to be applied, block 338 maps the aura identifier 306 of the aura requesting the backpressure onto a backpressure identifier 340. One or more aura identifier(s) 306 may be mapped to a single backpressure identifier 340. The second level of mapping is carried out in block 342. Block 342 comprises a structure mapping a backpressure identifier 340 on one or more channel(s) in the interface 302. Consequently, when any aura with an aura identifier 306 mapped on a backpressure identifier 340 is in a backpressure state, then all interface 302 channels mapped on the backpressure identifier 340 are in a backpressure state.

The various aspects of this disclosure are provided to enable a person having ordinary skill in the art to practice the present invention. Various modifications to these aspects will be readily apparent to persons of ordinary skill in the art, and the concepts disclosed therein may be applied to other aspects without departing from the spirit or scope of the invention. Thus, the present invention is not intended to be limited to the aspects shown herein but is to be accorded the widest scope consistent with the principles and novel features disclosed herein.

All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for virtualization of a quality of service, comprising:
    associating a packet received at an interface with an aura via an aura identifier by evaluating information of the internal fields of the packet's structure and information external to the packet's structure;
    determining configuration parameters for the aura, comprising a parameter identifying maximum number of buffers that may be allocated to the aura (AURA_CNT_LIMIT), a parameter identifying number of buffers allocated at a particular time (AURA_CNT), and a parameter identifying aura level related to the pool of available buffers (AURA_POOL_LEVELS);
    determining a pool of buffers for the aura;
    determining the state of the pool resources, the resources comprising a level of buffers available in the pool and a level of buffers allocated to the aura; and
    determining a quality of service for the packet in accordance with the determined state of the pool and the configuration parameters for the aura.

2. The method as claimed in claim 1, wherein the determining a quality of service for the packet comprises:
    comparing the determined level of buffers available in the pool with a first threshold;
    comparing the determined level of buffers allocated to the aura with a second threshold; and
    providing an interrupt when either the determined level of buffers available in the pool crosses the first threshold and/or when the determined level of buffers allocated to the aura crosses the second threshold.

3. The method as claimed in claim 2, further comprising:
    adding resources to or removing resources from the pool in accordance with the provided interrupt and the direction of crossing the first and/or the second threshold; wherein the resources are removed from the pool when the first threshold was crossed from the value less that the first threshold to a level greater than the first threshold and/or when the second threshold was crossed from the value less that the second threshold to a level greater than the second threshold; and
    the resources are added otherwise.

4. The method as claimed in claim 1, wherein the determining a quality of service for the packet comprises:

comparing the determined level of the buffers available in the pool with the value of the configuration parameters of aura levels related to the pool of buffers;

comparing the determined level of aura buffers allocated to the aura with the value of the configuration parameters of aura levels related to the buffers allocated the aura; and determining the quality of service for the packet in accordance with the result of the comparing.

5. The method as claimed in claim 4, wherein the determining the quality of service for the packet in accordance with the result of the comparing comprises:

dropping the packet when
the determined level of the buffers available in the pool is less than the value of the determined configuration parameter AURA_POOLS_LEVELS[DROP], or
the determined level of buffers allocated to the aura is greater than the value of the determined configuration parameter AURA_CNT_LIMIT, or
the determined level of buffers allocated to the aura is greater than the value of the determined configuration parameter AURA_CNT_LEVELS[DROP].

6. The method as claimed in claim 4, wherein the determining the quality of service for the packet in accordance with the result of the comparing comprises:

carrying out random early discard of the packet when
the determined level of the buffers available in the pool is between the value of the determined configuration parameter AURA_POOLS_LEVELS[DROP] and the value of the determined configuration parameter AURA_POOLS_LEVELS[PASS], or
the determined level of the buffers allocated to the aura is between the value of the determined configuration parameter AURA_CNT_LEVELS[DROP] and the value of the determined configuration parameter AURA_CNT_LEVELS[PASS].

7. The method as claimed in claim 6, wherein the carrying out random early discard of the packet comprises:

calculating a first drop probability as a first function of the value of the determined configuration parameter AURA_POOLS_LEVELS[PASS] and the value of the determined configuration parameter AURA_POOLS_LEVELS[DROP];

calculating a second drop probability as a function of the value of the determined configuration parameter AURA_CNT_LEVELS[PASS] and the value of the determined configuration parameter AURA_POOLS_LEVELS[DROP];

combining the calculated first drop probability and the second drop probability;

generating a pseudorandom number; and carrying out random early discard in accordance with a result of a comparison of the combined drop probabilities with the pseudorandom number.

8. The method as claimed in claim 7, wherein the combining the calculated first drop probability and the second drop probability comprises:

taking the greater of the first drop probability and the second drop probability.

9. The method as claimed in claim 7, wherein the carrying out random early discard of the packet comprises:

dropping the packet when the pseudorandom number is smaller than or equal to the combined drop probabilities.

10. The method as claimed in claim 7, wherein the carrying out random early discard of the packet comprises:

dropping the packet when the pseudorandom number is smaller than the combined drop probabilities.

11. The method as claimed in claim 4, wherein the determining the quality of service for the packet in accordance with the result of the comparing comprises:

applying a backpressure when
the determined level of the buffers available in the pool is less than the value of the determined configuration parameter AURA_POOL_LEVELS [BP], or
the determined level of buffers allocated to the aura is less than the value of the determined configuration parameter AURA_CNT_LEVELS[BP].

12. The method as claimed in claim 11, wherein the applying a backpressure comprises:

mapping the aura identifier of all the auras requesting a backpressure to a backpressure indicator;

mapping the backpressure indicator onto one or more channels of the interface; and applying the backpressure in accordance with the backpressure indicator.

13. An apparatus for virtualization of a quality of service, comprising:

a parser configured to associate a packet received at an interface with an aura via an aura identifier by evaluating information of the internal fields of the packet's structure and information external to the packet's structure;

an aura management entity communicatively connected to the parser, the aura management entity being configured to determine configuration parameters for the aura, comprising a parameter identifying maximum number of buffers that may be allocated to the aura (AURA_CNT_LIMIT), a parameter identifying number of buffers allocated at a particular time (AURA_CNT), and a parameter identifying aura level related to the pool of available buffers (AURA_POOL_LEVELS), determine a pool of buffers for the aura, to determine the state of the pool resources, the resources comprising a level of buffers available in the pool and a level of buffers allocated to the aura, and to determine a quality of service for the packet in accordance with the determined state of the pool and the configuration parameters for the aura.

14. The apparatus as claimed in claim 13, wherein the aura management entity determines a quality of service for the packet by being configured to:

compare the determined level of buffers available in the pool with a first threshold;

compare the determined level of buffers allocated to the aura with a second threshold; and provide an interrupt when either the determined level of buffers available in the pool crosses the first threshold and/or when the determined level of buffers allocated to the aura crosses the second threshold.

15. The apparatus as claimed in claim 14, further comprising:

means for adding resources to or removing resources from the pool in accordance with the provided interrupt and the direction of crossing the first and/or the second threshold; wherein the resources are removed from the pool when the first threshold was crossed from the value less that the first threshold to a level greater than the first threshold and/or when the second threshold was crossed from the value less that the second threshold to a level greater than the second threshold; and the resources are added otherwise.

16. The apparatus as claimed in claim 13, wherein the aura management entity determines a quality of service for the packet by being configured to:

compare the determined level of the buffers available in the pool with the value of the determined configuration parameters of aura levels related to the pool of buffers;

compare the determined level of aura buffers allocated to the aura with the value of the configuration parameters of aura levels related to the buffers allocated the aura; and determine the quality of service for the packet in accordance with the result of the comparing.

17. The apparatus as claimed in claim 16, wherein the aura management entity determines a quality of service for the packet by being configured to drop the packet when the determined level of the buffers available in the pool is less than the value of the determined configuration parameter AURA_POOLS_LEVELS[DROP], or the determined level of buffers allocated to the aura is greater than the value of the determined configuration parameter $AURA_{13}CNT\_LIMIT$, or the determined level of buffers allocated to the aura is greater than the value of the determined configuration parameter AURA_CNT_LEVELS[DROP].

18. The apparatus as claimed in claim 16, wherein the aura management entity determines a quality of service for the packet by being configured to carry out random early discard of the packet when the determined level of the buffers available in the pool is between the value of the determined configuration parameter AURA_POOLS_LEVELS[DROP] and the value of the determined configuration parameter AURA_POOLS_LEVELS[PASS], or the determined level of the buffers allocated to the aura is between the value of the determined configuration parameter AURA_CNT_LEVELS[DROP] and the value of the determined configuration parameter AURA_CNT_LEVELS[PASS].

19. The apparatus as claimed in claim 18, wherein the aura management entity carries out random early discard of the packet by being configured to:

calculate a first drop probability as a first function of the value of the determined configuration parameter AURA_POOLS_LEVELS[PASS] and the value of the determined configuration parameter AURA_POOLS_LEVELS[DROP];

calculate a second drop probability as a function of the value of the determined configuration parameter AURA_CNT_LEVELS[PASS] and the value of the determined configuration parameter AURA_POOLS_LEVELS[DROP];

combine the calculated first drop probability and the second drop probability;

generate a pseudorandom number; and carry out random early discard in accordance with a result of a comparison of the combined drop probabilities with the pseudorandom number.

20. The apparatus as claimed in claim 19, wherein the aura management entity combines the calculated first drop probability and the second drop probability by being configured to take the greater of the first drop probability and the second drop probability.

21. The apparatus as claimed in claim 19, wherein the aura management entity carries out random early discard of the packet by being configured to drop the packet when the pseudorandom number is smaller than or equal to the combined drop probabilities.

22. The apparatus as claimed in claim 19, wherein the aura management entity carries out random early discard of the packet by being configured to drop the packet when the pseudorandom number is smaller than the combined drop probabilities.

23. The apparatus as claimed in claim 16, wherein the aura management entity determines a quality of service for the packet by being configured to apply a backpressure when the determined level of the buffers available in the pool is less than the value of the determined configuration parameter AURA_POOL_LEVELS [BP], or the determined level of buffers allocated to the aura is less than the value of the determined configuration parameter AURA_CNT_LEVELS[BP].

24. The apparatus as claimed in claim 23, wherein the aura management entity applies a backpressure by being configured to:

map the aura identifier of all the auras requesting a backpressure to a backpressure indicator;

map the backpressure indicator onto one or more channels of the interface; and apply the backpressure in accordance with the backpressure indicator.

* * * * *